UNITED STATES PATENT OFFICE.

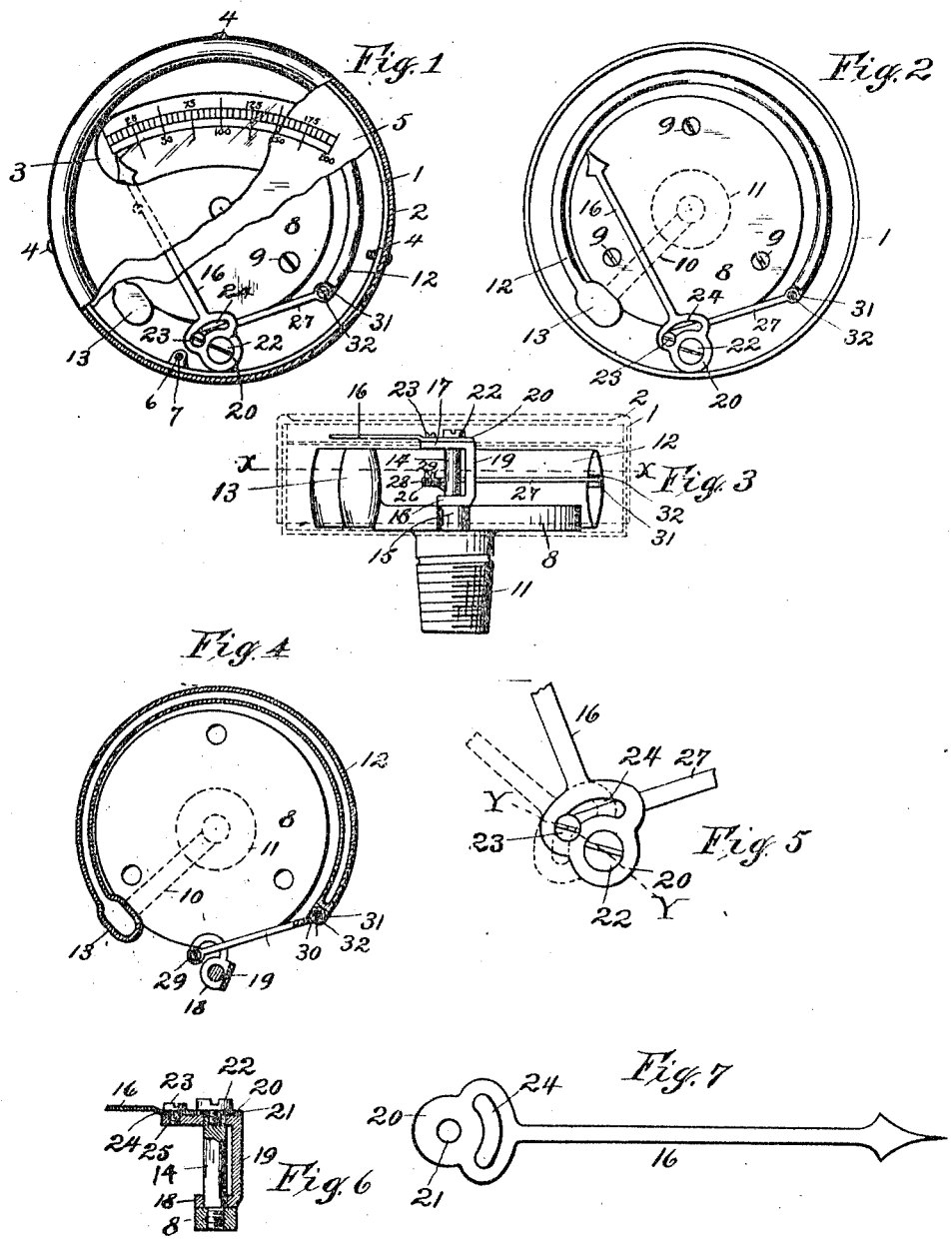

HARUTÜN B. AZADIAN, OF SYRACUSE, NEW YORK, ASSIGNOR TO AKABI R. AZADIAN, OF SYRACUSE, NEW YORK.

PRESSURE-GAGE.

1,072,415.

Specification of Letters Patent.

Patented Sept. 9, 1913.

Application filed May 20, 1909. Serial No. 497,291.

*To all whom it may concern:*

Be it known that I, HARUTÜN B. AZADIAN, a subject of the Sultan of Turkey, and resident of Syracuse, in the county of Onondaga, in the State of New York, United States of America, have invented new and useful Improvements in Pressure-Gages, of which the following, taken in connection with the accompanying drawings, is a full, clear, and exact description.

This invention relates to the class of gages which embody a circular-shaped flattened tube rigidly sustained at one end and communicating at said end with an air- or steam-pipe, the opposite or free end of the tube being closed and connected by a suitable mechanism to a pointer or indicator which traverses a dial, it being well known to persons familiar with such construction that through the admission of the air or steam into the circular tube the latter tends to straighten out and automatically return to its normal shape incident to the increase and decrease in pressure, whereby the pointer is moved accordingly over the dial.

One of the objects of the present invention is to produce a pressure-gage of the type specified which shall be very simple, strong and durable in construction, and will permit the parts to be easily and quickly assembled, and which will be inexpensive to manufacture.

Another object of the present invention is to provide the gage with simple, reliable and convenient means for adjusting the pointer or indicator when required.

To that end the invention consists in certain novel details in the construction of the gage as hereinafter fully described and set forth in the claims.

In the accompanying drawings Figure 1. is a front view of a pressure-gage, with the inclosing-case and dial broken away to illustrate my improvements, Fig. 2. is a front view of the interior of the inclosing case with the dial removed; Fig. 3 is a detached edge view of the disk on which the usual circular-shaped air- or steam-tube and the pointer-operating mechanism are supported; Fig. 4. is a horizontal section on the line —x—x— in Fig. 3; Fig. 5. is an enlarged detail front view showing more clearly the pivotal support of the pointer and pointer-adjusting means; Fig. 6. is a longitudinal sectional view on the line —Y—Y— in Fig. 5; and Fig. 7. is a detail view of the pointer.

Like numerals of reference indicate like parts in the several views of the drawings.

This gage is more particularly adapted to be attached to an air-pipe for indicating the pressure, and is especially designed to be used in the inflation of automobile-tires, although it may be used in many other instances.

The gage comprises an inclosing-case —1— which may be of any suitable style, and is provided with a removable front —2— which may have a glass face, or be formed with a sight-opening —3— as shown. The front is secured in position by means of screws —4—4— which extend into the case and upon which the marginal portion of the usual dial —5— rests, said dial being secured in the case by means of a screw —6— passing through coinciding apertures provided in the dial and an ear —7— projecting on the interior of the case.

Within the case is disposed a metal disk —8— secured to the rear wall by means of screws —9—9—. This disk is provided with the usual transverse bore —10— extending from its center to the edge thereof and forming an air-passage which communicates with a screw-threaded nipple —11— secured to or formed on the back of the disk and projecting through an aperture in the back of the case to which nipple is to be attached an air-pipe. On said disk is mounted the circular-shaped flattened tube —12— commonly employed in gages of this character. The said tube embraces a portion of the disk as usual and is rigidly secured at one end in a lug —13— projecting from the front face of the disk at its edge, at which end the said tube communicates with the air-passage —10— in the well known manner, the opposite or free end of the tube being closed.

The parts heretofore referred to are well known in gages and therefore do not require further description.

My invention resides in the construction and arrangement of the adjustable pointer, its support and actuating mechanism, in combination with the circular-shaped flattened tube as will now be explained.

—14— denotes a post rigidly projecting from the disk —8— and preferably secured in an aperture provided in a projection or lug —15— on the edge of the disk and disposed adjacent to the sustained end of the tube.

—16— denotes the pointer which is pivotally connected to the post —14— so as to traverse the dial —5— in the well known manner. On the said post is supported oscillating means which moves the pointer and is actuated by aforesaid tube. This oscillating means comprises preferably two connected levers —17— —18— pivoted to the respective end portions of the post, the outer lever having the pointer adjustably connected to it, and the other lever connected to the free end of the tube. I prefer to connect the pivoted ends of the lever by an integral bar —19— disposed parallel to the post —14—, the outer end of which post protrudes slightly through the lever —17—. The pointer is formed integral with a flat plate —20— which is provided with an aperture —21— receiving loosely through it the protruding outer end of the post. Into the outer end of the post is inserted a screw —22— which bears with its head on the plate —20—. This plate is connected to the outer end of the lever —17— by means of a screw —23— passing through the parts. To permit the pointer to be adjusted in relation to the dial when required, I provide the plate —20— with a curved slot —24— which is concentric with the pivot, and coincides with a threaded aperture —25— in the lever —17—. The screw —23— extends through the slot —24— and is inserted in the aperture —25— whereby its head bears on the outer face of the plate —20— to clamp the latter adjustably to the lever. The inner lever —18— is curved so as to extend part way around the post —14— and is deflected from the disk —8—, the free end of which lever is provided with a threaded aperture —26—. To said lever —18— is connected one end of a rod —27— provided thereat with a plain aperture —28— coinciding with the aperture —26—, through which apertures pass a screw —29—. The opposite end of the rod —27— is provided with a plain aperture —30— coinciding with a threaded aperture in an ear —31— formed on the free end of the circular-shaped flattened tube, through which apertures pass a screw —32—.

What I claim as my invention is:

1. In a pressure-gage of the class specified, the combination with a suitably sustained disk and a dial supported in front of the disk, of a post secured to the disk near the edge thereof, a pointer pivoted to said post, an oscillating lever pivoted to the post, pressure-controlled means for actuating the lever, and means for connecting the pointer adjustably to the lever as set forth.

2. In a pressure-gage of the type specified, the combination with a suitably supported disk, and a circular-shaped flattened air-tube attached at one end to the disk, of a post secured to the disk adjacent to the attached end of the tube, two connected levers mounted on the post, a pointer pivoted at one end to the post and actuated by one lever, and means connecting the free end of the said tube to the other lever for operating the latter as set forth.

3. In a pressure-gage of the type specified, the combination with a suitably supported disk and a circular-shaped flattened air-tube rigidly attached at one end to said disk, of a post rigidly mounted on the disk, two levers pivoted to the respective end portions of the post and connected by an integral bar disposed adjacent to and parallel with the post, a pointer attached to a plate pivoted to the outer end of the post, said plate being provided with a slot which is concentric with the pivot, a screw passing through the slot and entering the adjacent lever for clamping the pointer adjustably to said lever, and a rod pivotally connected at one end to the other lever and pivotally connected at its opposite end to the free end of the tube as set forth.

HARUTÜN B. AZADIAN.

Witnesses:
GILES B. EVERSON,
CHAS. W. KIRSCHENBAUM.